Figure 1:
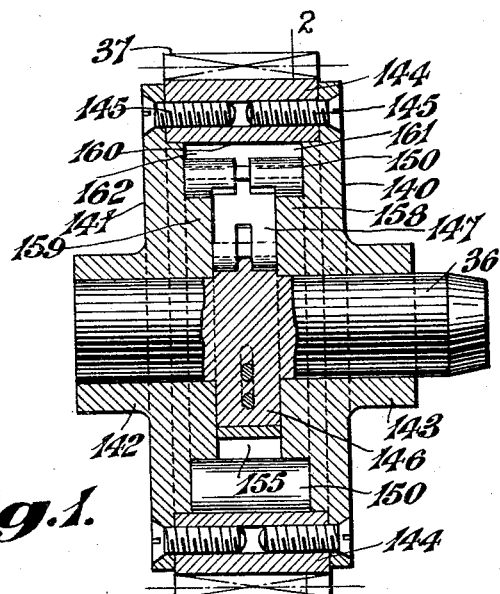

March 21, 1933. W. C. PITTER 1,902,375

CLUTCH

Original Filed Sept. 20, 1924

Inventor
Walter Charles Pitter
By B Singer, Atty.

Patented Mar. 21, 1933

1,902,375

UNITED STATES PATENT OFFICE

WALTER CHARLES PITTER, OF LONDON, ENGLAND, ASSIGNOR TO PITTER TRUST, A COMMON-LAW TRUST

CLUTCH

Original application filed September 20, 1924, Serial No. 738,829, and in Great Britain August 28, 1924. Divided and this application filed July 18, 1928. Serial No. 293,593.

This invention relates to automatically-operating clutches of the kind in which a moving driving member transmits a corresponding motion to an adjacent driven member and in one direction only, the reverse movement of the driving member or the overrunning of the driven member operating to declutch the two members whereby the driving member may move freely in the reverse direction or whereby the driven member may rotate freely or overrun the driving member in the forward direction.

The chief objects of the invention are to provide an improved clutch of simple construction, of few parts, and one which may have a highly rapid and substantially instantaneous gripping action and which at the same time is strong and positive. Other objects and advantages will appear hereinafter.

The invention is illustrated herein, but without limitation to various details, as a clutch comprising a rotary power or driving member and a rotary driven member, one thereof carrying a rocking, tiltable or canting clutch piece or gripper, and preferably a plurality of such clutch pieces, the same operating against the concentric facing sides of an annular groove or recess in the other rotary member, each of these clutch pieces being operatively connected to the one of these rotary members not having the groove so as to effect the desired canting of them in the groove. Motion-transmitting means for tilting the clutch piece are shown herein as a thrust member or strut bearing at one end against one end of the clutch piece and with the other end of the strut bearing eccentrically against the power member and in a somewhat tangential arrangement therewith.

Any suitable number of these clutch pieces or grippers may be provided, and preferably several of them are arranged at uniform circumferential distances from each other. I have illustrated herein a double clutch mechanism, designed for heavy duty, comprising two pairs of oppositely-disposed clutch faces side by side, with three coacting grippers.

The strut of each clutch piece is shown as being arranged to operate on what I shall term the rear end of the associated gripper, namely the end thereof extending opposite to the direction in which the clutch piece or gripper moves bodily when transmitting power according to the illustration shown. These grippers have bearing surfaces or areas longitudinally or circumferentially offset and adapted to be put into engagement with the walls defining the groove or recess which is shown in the drawing, but without limitation, as being in one of the rotary members. Owing to the relation of the struts with the rear ends of the clutch pieces respectively these combined elements, namely struts and clutch pieces, constitute a jointed lever structure of variable angularity.

Each clutch piece may be and preferably is provided with a spring arranged to maintain the clutch piece in position for immediate clutching action when the driving force is applied, which may be when the clutch is stationary or overrunning. Should the driven member be turning more rapidly than the driving member, or overrunning, the spring maintains the grippers against forward drag and holds them in position for instant re-gripping effect.

Instead of transmitting pressure through the pivot or hinge pins of the struts, the ends of the struts may be designed, as illustrated, to form abutting surfaces against their adjacent members, as by making the pivotal connections of the well-known knuckle-joint type, by curving the end of each strut to engage a correspondingly curved bearing surface in the connected member.

Figure 2:
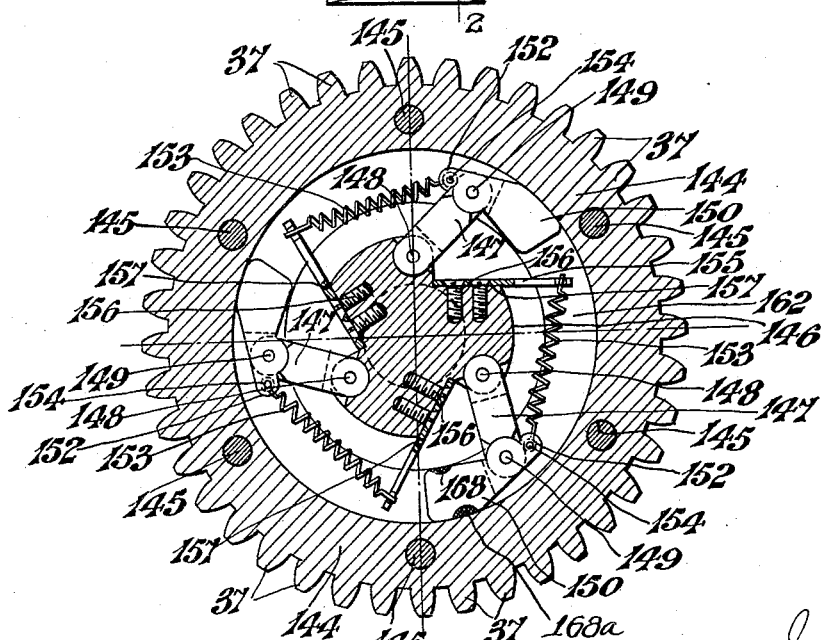

A device embodying the invention is illustrated by the accompanying drawing, wherein Figure 1 is a medial longitudinal vertical section through the mechanism, and Fig. 2 is a transverse section on the line 2—2 of Fig. 1.

In the present illustrative arrangement the driving member is a shaft 36 while the driven member is shown as a gear wheel structure 37 comprising a toothed rim 144 and side disks 140, 141 held by screws 145 to the rim, the side disks 140 and 141 having hubs 142 and 143. The gear wheel-structure 37 rotates freely at these hubs on the shaft.

The shaft 36 has rigidly secured to it a member 146 in the form of a hub, collar or flange inwardly recessed at uniform circumferential distances apart to receive the ends of three struts, thrust or compression members 147 respectively connected to the flange or hub member 146 by pins 148 and engaging the bottom surfaces of the recesses by curved bearing surfaces to form knuckle hinge joints, the other ends of the struts being connected at the pivot pins 149 to clutch pieces 150 respectively.

Each of the elongated clutch pieces or grippers 150 has a rearwardly-extending part 152 to which one end of a tensioning spring 153 is connected by a pin 154, the other end of the spring being connected to the outer or free end of an anchoring bar 155 held by screws 156 to flat faces 157 formed in the recesses in the hub member 146. Spring means of other form and otherwise located may be used to maintain the clutch pieces in position for instant gripping action.

On the inner faces of the side disks 140 and 141 are integral cylindrical concentric portions 158 and 159 respectively and which are of such reduced diameter that their peripheral edges will form the inner sides or surfaces respectively of the two laterally-opposite annular grooves or recesses 161 and 162, the radially outer sides of these two grooves or recesses being defined by the inner surface 160 of the ring 144. Each clutch piece 150 has a forward part extending in opposite lateral directions into these recesses 161 and 162 respectively, and this forward part is in close yet loose relation to the walls defining the recesses when not in actual clutching action.

The forward portions of the clutch pieces 150 which fit closely yet loosely in the annular grooves 161 and 162 are of such width and shape that when tilted in the plane of the wheel, as by having their rear ends moved radially outward, they will present a greater radial thickness within the grooves and grip the opposite walls thereof at lines or areas out of alignment with a line passing radially through the center of the shaft 36 and either of the areas of gripping contact. In other words, these gripping areas are offset circumferentially so that a radial line would pass between them. These areas of contact may be on bearing pieces which may be renewable and also self-adjustable, as the ones marked 168 and 168a, being of semicircular section at the back and loosely positioned in semicircular seats so as to adjust themselves automatically as the clutch pieces 150 are tilted. See bottom of Fig. 2.

Each clutch piece 150 is a lever wherein the power is applied at what I call the rear end portion, at the connection 149, as the device is illustrated, and either of the contact areas corresponding to the areas 168 or 168a (bottom Fig. 2) may be considered the fulcrum. Work is done, however, at both areas corersponding with 168 and 168a since they respectively grip upon the radially opposite walls defining the groove as 161.

The tilting or rocking of the clutch pieces 150 in the plane of the wheel 37 is effected by the rotation of the shaft 36 in the clockwise direction in Fig. 2. Since the struts 147 are outwardly and forwardly directed at an angle with a radial line through their inner connections at 148, the pivots at 148 being off the center of shaft rotation, a somewhat tangential thrust upon the struts occurs, and this carries the rear ends of the grippers respectively outward and causes their forward end portions to cant or tilt and become frictionally locked in the groove, thus clutching the driving and driven members together through the pivotally united arms 147 and 150.

The reverse movement of shaft 36, or the equivalent of that in relative movement between the driving and driven members, tends to tilt the clutch pieces 150 sufficiently in the opposite direction to free them from clutching relation to the walls defining the grooves 161—162.

This clutching device may be made with one annular clutch groove, as 162, only, the side disk 140 and associated parts being dispensed with. The ring 144 may be made integral with the disk 141 or any other suitable construction adopted. The teeth on the ring 144 may of course be replaced by any other transmission device.

It will be observed that a very slight forward movement of the driving shaft effects the coupling, and that the greater the resistance the greater the clutching effect.

The strut 147 and the associated gripper lever 150 constitute a jointed lever structure, one end portion of which carries friction or clutching surfaces or areas adapted to bind in the groove when the structure is flexed in one direction. The set of levers is illustrated as being carried by the inner member as the preferred arrangement, but without limitation thereto.

This application is a division of my copending application of Letters Patent filed September 20, 1924, Ser. No. 738,829.

I contemplate as being included in this invention all such changes, departures and variations from what is thus specifically illustrated and described as fall within the scope of the appended claims.

I claim:

1. A one-way rotary clutch, comprising a driving member and a driven member, a clutch piece and a strut, the strut bearing at one end against one of the members, the other member being provided with an annular groove of which the opposite sides form concentric friction surfaces of different diameters, the clutch piece being provided at one end with oppositely-disposed gripping surfaces for engaging the inner and outer concentric friction surfaces when the clutch piece is tilted in a plane which is substantially at right angles to the axis of revolution, the rear end of the clutch piece bearing against the outer end of the strut, the strut being of such length as to hold the clutch piece substantially tangentially to the groove of the annular grooved member and to tilt it in such groove so that it will grip the opposite sides of the groove only when one of the members is moved rotatively relative to the other in one direction.

2. A one-way rotary clutch, comprising a driving member and a driven member, a clutch piece, a spring and a strut, the strut bearing at one end against one of the members, the other member being provided with an annular groove of which the opposite sides form concentric friction surfaces of different diameters, the clutch piece being provided at one end with oppositely-disposed gripping surfaces for engaging the inner and outer concentric friction surfaces when the clutch piece is tilted in a plane which is substantially at right angles to the axis of revolution, the rear end of the clutch piece bearing against the outer end of the strut, the strut being of such length as to hold the clutch piece substantially tangentially to the groove of the annular grooved member and to tilt it in such groove so that it will grip the opposite sides of the groove only when one of the members is moved rotatively relative to the other in one direction, the spring being operatively between the member against which the strut bears and the friction piece and being adapted to force the friction piece yieldingly in a direction tending to put the strut under compression.

3. A one-way rotary clutch, comprising a driving member and a driven member, a clutch piece, a strut and two knuckle joints associated therewith, each having curved pressure transmitting surfaces, the strut bearing at one end against one of the members at one of said knuckle joints, the other member being provided with an annular groove of which the opposite sides form concentric friction surfaces of different diameters, the clutch piece being provided at one end with oppositely-disposed gripping surfaces for engaging said inner and outer concentric friction surfaces when the clutch piece is tilted in a plane which is substantially at right angles to the axis of revolution, the rear end of the clutch piece bearing against the outer end of the strut at the other one of said knuckle joints, the strut being of such length as to hold the clutch piece substantially tangentially to the groove of the annular grooved member and to tilt it in such groove so that it will grip the opposite sides of the groove only when one of the members is moved relative to the other in one direction.

4. A one-way rotary clutch comprising a driving member and a driven member, a clutch piece and a strut, the strut bearing at one end on one of the members, the other member being provided with two oppositely-disposed annular grooves, the opposite sides of each of which grooves form parallel friction surfaces, the clutch piece being provided at each side thereof at one end portion with a pair of lateral extensions, each extension having oppositely-disposed gripping surfaces between and adapted for binding action upon the parallel friction surfaces of the associated groove, the rear end of the clutch piece bearing upon the outer end of the strut, the strut being of such length as to hold the clutch piece substantially tangentially to the annular grooves and to tilt it in such grooves so that the gripping surfaces thereof will grip said parallel friction surfaces when one of the members is turned relatively to the other in one direction.

5. A one-way rotary clutch comprising a driving member and a driven member, a clutch piece, a spring and a strut, the strut being pivoted at one end to one of the members, the other member being provided with two oppositely-disposed annular grooves of the same size, the opposite sides of each of which form concentric friction surfaces of different diameters, the clutch piece being provided at one end and at each side thereof with oppositely-disposed gripping surfaces for engaging the inner and outer concentric friction surfaces of the adjacent groove when the clutch piece is tilted in a plane which is substantially at right angles to the axis of revolution, the rear end of the clutch piece being pivoted to the outer end of the strut, the strut being of such length as to hold the clutch piece substantially tangentially to the annular grooves and to tilt it in such grooves so that it will grip the opposite sides of each groove only when the members are rotated relatively to one another in one direction, the spring being carried by the member to which one end of the strut is pivoted, the other end of the strut being pivoted to the clutch piece normally rearward of the gripping surfaces.

6. A one-way rotary clutch, comprising a driving member and a driven member, a plurality of clutch pieces and a plurality of struts, each strut being pivoted at one end to one of the members, the other member being provided with an annular groove of which the opposite sides form concentric friction surfaces of different diameters, each clutch piece being provided at one end with oppositely-disposed gripping surfaces for engaging the inner and outer concentric friction surfaces when the clutch piece is tilted in a plane which is substantially at right angles to the axis of revolution, the rear end of each clutch piece being pivoted to the outer end of a strut, each strut being of such length as to hold the clutch piece substantially tangentially to the groove of the annular grooved member and to tilt it in such groove so that it will grip the opposite sides of the groove only when one of the members is moved rotatively relatively to the other in one direction.

7. A one-way rotary clutch comprising a driving member and a driven member, a clutch piece and a strut, the strut being pivoted at one end to one of the members, the other member being built up of two flanges detachably connected to an intermediate annular member and provided with two oppositely-disposed annular grooves of the same size, the opposite sides of each of which form concentric friction surfaces of different diameters, the outer surface being in the intermediate member, while the inner ones are formed on the flanges, the clutch piece being provided at each side thereof at one end portion with opposite-disposed gripping surfaces for engaging the inner and outer concentric friction surfaces of the adjacent groove when the clutch piece is tilted in a plane which is substantially at right angles to the axis of revolution, the rear end of the clutch piece being pivoted to the outer end of the strut, the strut being of such a length as to hold the clutch piece substantially tangentially to the annular grooves and to tilt it in such grooves so that it will grip the opposite sides of each groove only when one of the members is turned relatively to the other in one direction.

8. The combination of claim 1 hereof in which there are means tending to maintain the clutch piece yieldingly in position for immediate gripping action when the device is at rest and when one of said members is running freely with respect to the other thereof.

9. The combination of claim 3 hereof in which there are means tending to maintain the clutch piece yieldingly in position for immediate gripping action when the device is at rest and when one of said members is running freely with respect to the other thereof.

10. The combination of claim 4 hereof in which there are means tending to maintain the clutch piece yieldingly in position for immediate gripping action when the device is at rest and when one of said members is running freely with respect to the other thereof.

11. The combination of claim 6 hereof in which there are means tending to maintain the clutch piece yieldingly in position for immediate gripping action when the device is at rest and when one of said members is running freely with respect to the other thereof.

12. In a rotary clutch, the combination of a driving member and a driven member on a common axis, one of said members having spaced parallel clutch faces, an elongated clutch piece extending in the general direction of said faces and having a part loosely positioned to engage said clutch faces, means tending to maintain the elongated clutch piece yieldingly in position for immediate gripping action when the device is at rest and when one of the members is running freely with respect to the other member thereof and rigid means movably connected with that companion member which does not have the parallel clutch faces for tilting said clutch piece, said last named rigid means being movably connected with the elongated clutch piece at the end opposite of that portion thereof which has the part loosely positioned to engage both of said clutch faces.

13. A rotary automatically acting one-way clutch with a driving member and a driven member on a common axis, the members providing radially spaced apart clutch faces on circular lines concentric with said axis, an elongated clutch piece having a pair of gripping surfaces which are circumferentially offset from each other, and one of which is normally in close but free running association with one of said faces while the other is normally in close but free running association with the other one of said faces, means for maintaining the clutch piece yieldingly in position for immediate gripping action when the clutch is at rest, and one of the clutch members is running freely with respect to the other thereof, a thrust element bearing at one of its end portions against said clutch piece at a place circumferentially distant from said gripping surfaces, said thrust element bearing at its other end against one of said clutch members and being tangentially arranged with respect to said axis, whereby the rotative movement of one of said clutch members relative to the other to a slight extent tilts said gripping surfaces upon the faces of the elongated clutch piece to bring at least one of said faces into gripping engagement with one of said members, while the thrust member bears against the other one of said clutch members.

14. A rotary automatically acting one-way clutch comprising a driving member and a driven member on a common axis, said members having radially spaced apart clutch faces on circular lines concentric with said axis, an elongated clutch piece having a pair of gripping surfaces which are circumferentially offset from each other, and which are each normally in close but free running association with said clutch faces respectively, a thrust member bearing at one of its end portions against said clutch piece at a place circumferentially distant from said gripping surfaces and bearing at its other end against one of said clutch members, the thrust member being tangentially arranged with respect to the axis, whereby the rotative movement of one of said members relative to the other thereof to a slight extent tilts the gripping surfaces being slightly farther than the outer one of said surfaces from the place where the thrust member bears against the clutch piece.

WALTER CHARLES PITTER.